Dec. 21, 1937.　　　A. S. TREGER　　　2,103,025
EYEGLASSES
Filed Aug. 26, 1936
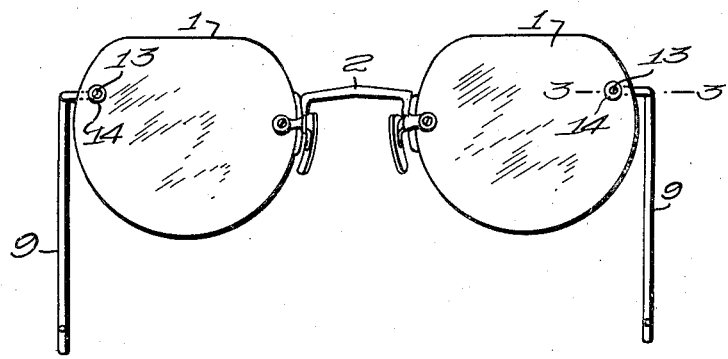
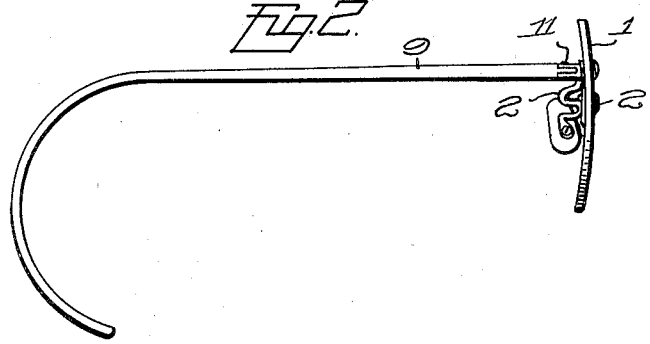
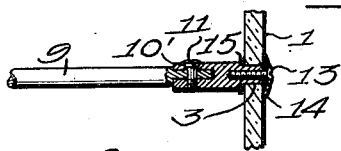
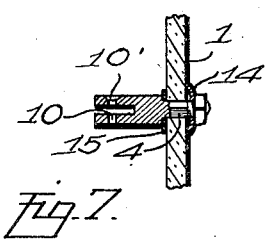
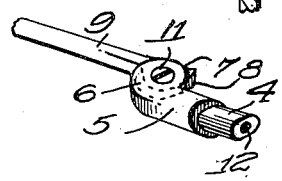
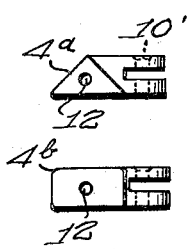
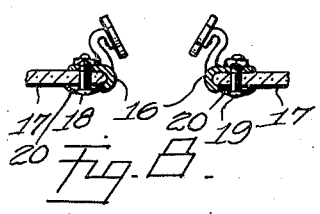

Patented Dec. 21, 1937

2,103,025

UNITED STATES PATENT OFFICE 2,103,025

EYEGLASSES

Aron S. Treger, Independence, Kans.

Application August 26, 1936, Serial No. 98,046

2 Claims. (Cl. 88—47)

My invention relates to improvements in eyeglasses and one object of the invention is the provision of an eyeglass which will present a most attractive and ornamental appearance.

Another object of my invention is the provision of an eyeglass which will retain the lenses in the proper line or focus when adjusted.

Another object of my invention is the provision of an eyeglass which will hold the lenses in proper adjustment and relation and prevent them from becoming loose.

Another object of my invention is the provision of an eyeglass which will be of simple and durable construction, inexpensive to make and thoroughly efficient and practical from every point of view.

To attain the desired objects my invention consists of an eyeglass embodying novel features of construction and combination of parts, substantially as described and claimed and as shown in the accompanying drawing, in which:—

Figure 1 represents a front view of an eyeglass constructed in accordance with and embodying my invention.

Figure 2 represents a side view of the eyeglass.

Figure 3 represents a sectional view taken on line 3—3 of Figure 1.

Figure 4 represents a perspective view of the lens connecting member and a part of the temple bar.

Figures 5 and 6 represent detail views of modified forms of lens connection.

Figure 7 represents a sectional detail view of a further modified form of lens connection and Figure 8 represents a sectional detail view of a modified form of nose piece connection.

Referring by numeral to the drawing in which similar numerals denote the same parts in all the views:

The numeral 1 denotes the lenses and 2 the nose piece or bridge structure which may be of the usual or any preferred construction.

The lenses at desired and proper locations are provided with elongated openings 3, which receive the similar shaped elongated lug 4, on the arm 5, formed with the inward curved portion 6, bifurcated at 7 to receive the head 8, on the end of the temple bar 9, the curved portion 6 and the head 8, being formed with aligned openings 10 and 10', to receive the pivot 11, forming a pivotal connection between the arm and temple bar to allow proper movement of the temple bar in a horizontal direction.

The pivotal connection between the arm and temple bar disposes said arm out of sight to make an attractive front appearance to the lens and also the horizontal movement of the temple bar permits easy application and fitting of the temple bars to the head.

The lug 4 is provided with a threaded opening 12 to receive the fastening screw 13, and spring ring washers 14 and 15 are disposed in proper relation to the arm, lug and lens as most clearly shown in Figures 3 and 7.

The lug 4, it will be noted, is of substantially flat form and thus fits a similar shaped opening in the lens and forms a species of lock fit in the lens and makes it impossible for the lenses to move out of line or work loose, and in Figure 5 the lug 4ᵃ, is of angular shape and in Figure 6 is of oblong form, but all forms of the lug serve in the same manner.

In Figure 8 the bridge connection is formed with the lens fitting loop 16, through which and the lens 17 pass the securing screws 18, whose heads 19 bear upon the spring washers 20.

It will also be noted that the connecting arm 5, for the temple bar has the angular portion 4, which fits in angular opening of the lens and also has the inner portion curved inward to bring the pivoted end of the temple bar back of and within the rear of the lens to dispose the temple bar out of sight and close to the head, which is a great advantage and adds greatly to the beauty of the eyeglass.

It will also be noted that the temple bar connection consists practically of a single member 5 formed with a shoulder to provide the lug 4, to fit the opening in the outer edge of the lens and that said lug is provided with a threaded opening 12 to receive a fastening screw inserted from the outside and easily accessible and that further that the member 5 is provided with a curved portion 6, bifurcated at 7 to receive the head 8 on the temple bar, which provides practically a single member for connecting the temple bar with the lens and permits easy adjustment of the temple bars to the wearer.

It will also be noted that the interposed springs or washers 14 and 15 serve to bear in such relation to the lens and fastening as to lock the lens in place.

It will be appreciated from the drawing and description that I provide an eyeglass which presents an ornamental and beautiful appearance, also that the eyeglass conforms to the width of the head of the wearer, also that the lenses are retained in proper line with reference to the eyes and cannot become loose or out of focus, and that in general in all respects the eyeglass is useful, practical and highly desirable.

I claim:

1. An eyeglass of the character described, comprising a pair of lenses, a bridge connecting said lenses, said lenses each formed near their outer edge with an opening of non-circular form in peripheral outline, temple bars, and a connection between each of the temple bars and its corresponding lens, said connection comprising a single member having its forward portion formed with a lug of non-circular form in peripheral outline to fit the non-circular opening in said lens, the rearward end of said connection terminating in a cylindrical temple connecting lug, the axis of said cylindrical lug being outwardly offset from the axis of said connection, a screw threaded opening in the outer end of said lug, a fastening screw engaging said threaded opening of the lug to retain the member in place and a pivotal connection at the inner end of said member between the member and temple bar.

2. An eyeglass of the character described, comprising a pair of lenses, a bridge connecting said lenses, said lenses each formed near their outer edge with an opening of non-circular form in peripheral outline, temple bars and a connection between each of the temple bars and its corresponding lens, said connection comprising a single member having its forward portion formed with a lug of non-circular form in peripheral outline to fit the non-circular opening in said lens the rearward end of said connection terminating in a cylindrical temple connecting lug, the axis of said cylindrical lug being outwardly offset from the axis of said connection, a screw threaded opening in the outer end of said lug, a fastening screw engaging said threaded opening of the lug to retain the member in place, a pivotal connection at the inner end of said member between the member and temple bar and spring washers fitting on said lug and bearing against the outer and inner face of the lens.

ARON S. TREGER.